United States Patent Office 2,996,479
Patented Aug. 15, 1961

2,996,479
MODIFIED POLYSILOXANES
Samuel Sterman, Snyder, N.Y., assignor to Union Carbide Corporation, a corporation of New York
No Drawing. Filed Apr. 30, 1954, Ser. No. 426,919
14 Claims. (Cl. 260—46.5)

This invention relates to new compositions of matter, comprising silicon containing polymers, especially suitable for use as coating materials. More particularly, the invention relates to new compositions of matter comprising modified polysiloxanes and to a process for the preparation thereof.

Organopolysiloxanes have become widely known as they possess numerous desirable properties which warrant their use in a wide variety of applications. For example, they possess a high dielectric capacity, chemical inertness, and excellent resistance to oxidation. These characteristics together with their extreme resistance to thermal degradation when compared with other known organic polymer materials have suggested their use as coating compositions. However, such use has not met with wide acceptance in the art as coatings prepared from organopolysiloxanes were found to lack satisfactory flexibility and tensile strength characteristics found in many organic polymers. In addition it was found that when compared to organic polymers, organopolysiloxanes possessed a slow cure rate and required the use of extraordinary high temperatures to effect curing.

It has been suggested that coating compositions having many of the superior characteristics of organopolysiloxanes but without their undesirable properties might be produced by combining therewith an organic polymer. For example, the use of blends of organopolysiloxanes and polymeric organic materials such as alkyd resins have been proposed as coating compositions. However, this proposal has not proven entirely satisfactory due to the incompatibility of the two types of polymers. Another proposal includes the effecting of a chemical union between organopolysiloxanes and alkyd resins. Usually, materials of this type are prepared by reacting under appropriate conditions a partially condensed polysiloxane, that is, one containing hydroxyl or alkoxy radicals bonded to some of the silicon atoms of the polymer, with alkyd or oil-modified alkyd resins containing free hydroxyl or carboxyl radicals. While copolymers of this type have improved overall properties as compared to organopolysiloxanes they appear to retain, to a slightly lesser extent, the undesirable characteristics of low tensile strength and poor flexibility. Moreover they lack the uniformly high quality essential to a commercial product in that the copolymer shows a haziness, indicative of partial incompatibility, which oftentimes has marked adverse effect on marketability.

The cause of the noted characteristics found in organopolysiloxane-alkyd copolymers is attributed to the fact that each of the starting materials employed contains numerous reactive groups which may result during the reaction in excessive inter-molecular condensation or in incomplete inter-molecular condensation with accompanying intra-molecular condensation. Excessive inter-molecular condensation leads to a highly cross-linked product and may occur either during the preparation of the composition to be cured or in the curing process. In the first instance an insoluble, and infusible material is obtained which is difficult to apply as a coating and when it occurs in the second instance, an extremely brittle final product is obtained. When incomplete inter-molecular condensation and accompanying intra-molecular condensation occurs the product obtained is not a true copolymer but instead comprises for the most part a mixture of homopolymers of the polysiloxane and alkyd resin.

More recently it has been proposed to prepare modified organopolysiloxanes by initially reacting a partially condensed polysiloxane with glycerol and subsequently reacting the product with a dicarboxylic acid. Modifications of this process include reacting a polysiloxane with a polycarboxylic acid and subsequently reacting the product with either glycerol or a glycerol-acid polyester. The products obtained by such processes although useful for certain limited applications are not entirely satisfactory as they are characterized by the inherent deficiencies found in organopolysiloxane-alkyd copolymers. As each of the materials employed to modify the organopolysiloxanes, that is glycerol, polycarboxylic acids and polyesters thereof, contains numerous reactive groups, condensation oftentimes occurs among the modifying materials and consequently a uniformly cross-linked product is rarely obtained.

It is an object of this invention to provide new compositions of matter comprising modified organopolysiloxanes having many of the superior characteristics of unmodified organopolysiloxanes but without their undesirable properties, which new compositions may be readily cured at relatively low temperatures.

The new compositions of matter of the present invention are modified organopolysiloxanes having a molecular structure comprising a plurality of recurring polysiloxane portions, containing monovalent silicon-bonded hydrocarbon groups, connected by divalent diester radicals. More specifically, the new polymers have a molecular structure comprising a plurality of recurring phenyl, or phenyl and methyl polysiloxane portions connected by divalent bis(oxyalkyl) dicarboxylate radicals through silicon-oxygen-carbon linkages.

In accordance with this invention the new polymers are prepared by reacting a member of a specific class of phenyl polysiloxanes or of phenyl and methyl polysiloxanes having a definite and well defined molecular composition with a member of a specific class of bis(hydroxyalkyl) dicarboxylates. The siloxanes employed as starting materials are relatively low molecular weight, partially condensed, phenyl polysiloxanes or phenyl and methyl polysiloxanes containing reactive hydrocarbonoxy groups, preferably alkoxy groups, bonded to some or all of the silicon atoms thereof. These siloxane intermediates have a hydrocarbon group to silicon atom ratio of from about 1.0 to 1.6 where, of course, the hydrocarbon group may be phenyl or a mixture of methyl and phenyl groups. In the latter instance, where the polysiloxane contains both phenyl and methyl groups bonded to silicon atoms, not over 40% of the total number of such groups are methyl groups and preferably the mol percent of methyl groups present should not be over 25%. The hydrocarbonoxy groups bonded to the silicon atoms of the intermediate are present in an amount such that the hydrocarbonoxy group to silicon atom ratio will be in a range of from about 0.2 to as high as 2 and generally will be in the range of from about 0.3 to 1.5. However, in no event will the percent by weight of hydrocarbonoxy groups present be less than 5% nor more than 40% of the weight of the polysiloxane. Polysiloxanes of the molecular composition described above have a molecular weight of from 400 to 4,000.

The manner whereby the desired polysiloxanes containing silicon-bonded hydrocarbonoxy radicals can be prepared may vary in accordance with several techniques. I may employ as starting materials any of the well known hydrolyzable derivatives of phenyl silanes or mixtures of hydrolyzable derivatives of phenyl silanes and methyl silanes. Such silane derivatives have the valences of the silicon atom thereof satisfied by only the hydrocarbon groups specified and by any of the known hydrolyzable radicals or elements such as halogens or alkoxy, aryloxy and amino radicals. Thus the silane derivatives may contain from 1 to 3 phenyl or methyl groups and from 3 to 1 hydrolyzable groups bonded to the silicon atom.

To prepare the siloxane intermediates employed in the processes of my invention from alkoxy silanes, a controlled hydrolysis and partial condensation method is employed. Hydrolysis is conducted by treating a solvent solution of a alkoxy silane, at carefully controlled temperatures, with an amount of water less than that normally required to effect complete hydrolysis of the derivative. Condensation occurs, to some extent, concurrently with hydrolysis and the degree thereof may be controlled by the addition of a catalyst or by varying the temperature.

When other hydrolyzable silanes such as the halosilanes are employed as the starting materials one of two procedures may be followed to prepare the polysiloxanes. For example, these hydrolyzable derivatives may be initially reacted with an alcohol, preferably an alkanol, to produce an alkyloxy silane which may be subsequently hydrolyzed and condensed as disclosed above, or they may be treated with an alcohol and water mixture in the presence of a solvent. In the latter instance the total amount of alcohol and water employed is such as to completely react with the available hydrolyzable radicals of the silane derivative. Thus both the water and alcohol react with the silane and the hydrolyzable radicals are replaced by either an alkoxy radical or by a hydroxyl radical. The hydroxyl radicals condense intermolecularly to form low molecular weight alkoxy-containing polymers.

The bis(hydroxyalkyl) dicarboxylates which are employed to prepare the new polymers of this invention may be readily prepared by the complete esterification of a dicarboxylic acid containing at least four but not more than fourteen carbon atoms with an aliphatic dihydric alcohol containing from two to four carbon atoms. Thus these dicarboxylates contain from eight to eighteen carbon atoms in the molecule. The dicarboxylates may also be prepared by reacting the above polyhydric alcohols with the available anhydrides of the above dicarboxylic acids. To insure the production of bis(hydroxyalkyl) dicarboxylates, an amount of the dihydric alcohol in excess of that required for the complete esterification of the acid or for the complete reaction with the anhydride is normally employed. Examples of the dihydric alcohols commonly used are ethylene glycol, 1,2-propylene glycol, 1,3-propylene glycol, diethylene glycol, and butylene glycol. The dicarboxylic acids which are esterified to produce the dicarboxylate starting materials include succinic acid, glutaric acid, adipic acid, pimelic acid, azelaic acid, sebacic acid, maleic acid, phthalic acid, terephthalic acid, endoalkylene phthalic acids and the like. Substituted dicarboxylic acids such as nitrophthalic acid, chlorophthalic acid, hexachloroendomethylene tetrahydrophthalic acid or other chloro- and nitro-substituted acids may also be employed. As hereinabove disclosed the known anhydrides of the various carboxylic acids may also be employed to prepare the dicarboxylate esters. The preferred anhydrides include maleic anhydride and phthalic anhydride.

An example of the method employed to prepare a bis(hydroxyalkyl) dicarboxylate such as bis(beta-hydroxyethyl) orthophthalate comprises reacting one mol of phthalic anhydride with two mols of ethylene glycol at a temperature of from about 160° to about 200° C. An additional amount of ethylene glycol is present during the reaction to insure the preparation of the diester to the exclusion of polyester materials.

The process whereby the new polymers of my invention are generally prepared comprises reacting stoichiometric amounts of a hydroxyl-containing dicarboxylate with a hydrocarbonoxy-containing polysiloxane. This reaction is a typical trans-esterification reaction and may be conducted, with or without the benefit of a solvent, at a temperature of from 140° C. to about 250° C. Thus for example, one equivalent weight of the hydroxy-containing dicarboxylate (based on its hydroxyl content) and one equivalent weight of the hydrocarbonoxy-containing polysiloxane (based on its hydrocarbonoxy content), preferably an alkoxy-containing polysiloxane, may be reacted by charging the ingredients to a flask connected to a condenser and heating to a temperature within the limits set forth above. An alcohol is evolved during the reaction and heating is continued until the viscosity increase of the contents of the flask indicates that bodying is imminent. The polymeric product is then dissolved in a suitable solvent until use, at which time it is applied to a surface and cured.

The amount of the hydroxyl-containing dicarboxylate in grams which comprises an equivalent weight may be readily determined by dividing the molecular weight of the ester by two, as there are only two reactive hydroxyl groups in the molecule. With respect to the polysiloxane, the amount in grams which comprises an equivalent weight may be determined by dividing the molecular weight of the reactive hydrocarbonoxy group by the weight percent of the hydrocarbonoxy groups in the molecule. For example, when an ethoxy-containing polysiloxane is employed, one equivalent weight thereof is determined by dividing the molecular weight of the group, which is 45, by the weight percent of ethoxy groups in the polysiloxane.

One embodiment of this invention comprises the addition of minor amounts of cure accelerators or hardening ingredients such as phenolic resins, urea formaldehyde resins, melamine formaldehyde resins or minor amounts of polyhydric alcohols for example glycerol or pentaerythritol. The resin materials are commercially available in solvent solutions and may be readily mixed with solvent solutions of the modified organopolysiloxanes of this invention. In general, these resins when employed are added in an amount of from about 5 percent to about 20 percent by weight of the modified organopolysiloxane. The latter modifying materials if employed are normally added in minor amounts to the reaction mixture of the hydrocarbonoxy-containing polysiloxane and the hydroxyl-containing dicarboxylate to provide an excess of hydroxy groups in the mixture. In such instances a slightly more brittle product is obtained which may have various specific applications.

From the above description of the invention it is readily seen that the modified organopolysiloxanes are unique in that the organosiloxane portions thereof are linked by only the dicarboxylate radicals. Cross-linking among the modifying ingredients which is common among the heretofore known modified organopolysiloxanes is thus avoided.

The invention may be illustrated by the following examples:

EXAMPLE I

A partially condensed phenyl and methyl polysiloxane, containing ethoxy groups bonded to some of the silicon atoms thereof, was prepared by treating a mixture comprising 60 mol percent phenyltrichlorosilane, 20 mol percent diphenyl dichlorosilane and 20 mol percent dimethyl dichlorosilane with a water-ethanol mixture in the presence of a solvent. The polymer had a hydrocarbon group to silicon atom ratio of 1.4, a phenyl group to methyl group ratio of 2.5, an ethoxy group to silicon atom ratio of 0.62, a molecular weight of 600 and contained 19.0 percent by weight of ethoxy groups.

To a three-liter three-neck flask equipped with stirrer, thermometer, condenser and take-off trap were charged five equivalent weights (1185 grams) of the above polysiloxane and five equivalent weights (628 grams) of bis(beta-hydroxyethyl) orthophthalate. The charge was rapidly heated to a temperature of 180° C. and subsequently to a temperature of 200–210° C. Ethanol was evolved during the reaction and collected in the trap. Heating was continued until the viscosity increase of the mixture indicated that bodying was imminent at which time a solvent, xylene, was added.

During the reaction one hundred and seventy grams of ethanol were evolved and collected, which amount is approximately 75 percent of the calculated total amount of ethanol (225 grams) to be received if the reaction were allowed to go to completion. The amount of ethanol recovered is usually below the amount calculated to be received in the event of a complete reaction and may be used as a control for the process time. In practice it will be desirable to conduct the reaction until from about 50 percent to about 90 percent of the total calculated amount of alcohol is obtained.

A No. 112 heat desized glass cloth of three mils thickness was impregnated with a solvent solution of the modified polysiloxane in two dips and cured to an overall thickness of seven mils. The impregnation procedure included a fifteen minute precure at 150° C. after the initial dip, and a one hour final cure at 200° C. The specimens were transparent, colorless, flexible tapes which were subjected to the following aging and bending tests, after curing and after aging at 200° C., wherein the dielectric strength was employed as a measure of performance.

| Specimen | Dielectric Strength | |
| --- | --- | --- |
| | After Cure, volts per mil | After 850 hrs. at 200° C., volts per mil |
| Unbent | 1,750 | 2,350 |
| Bent 180° over 1/8" mandrel | 1,850 | 1,470 |

For the purposes of comparison a glass cloth similar to that above was coated with various organic resins including an alkyd resin and subjected to the above tests and in each instance it was found that the coated glass cloths badly deteriorated during aging at 200° C. in about forty-eight hours. One of the organic resin-coated glass cloth specimens, a "class B" commercial product, failed completely (0 volts per mil) in three days at 200° C. when subjected to the "Bent Dielectric Test" while another specimen of the same material failed completely in 450 hours when subjected to the "unbent dielectric strength test."

EXAMPLE II

To a 500 ml., three-neck flask equipped with stirrer, thermometer, condenser and take-off trap were charged one-half equivalent weight (129 grams) of a partially condensed polysiloxane, identical in composition to that disclosed in Example I with the exception that it contained 17.4 percent by weight of ethoxy groups, and one-half equivalent weight of bis(beta-hydroxyethyl) 3-nitrophthalate. Heat was applied and the temperature of the contents of the flask rose to approximately 140° C. During this period some ethanol was evolved and collected. Subsequently the temperature was gradually raised until the viscosity increase of the mixture indicated that bodying the imminent. At this point the applied heat was removed and it was found that approximately 69.5% by weight of the calculated weight of ethanol to be received in the event of complete reaction, had been collected. The modified polysiloxane was then dissolved in xylene and applied to a No. 17 nickel clad copper wire and cured. This specimen possessed excellent flexibility and abrasion properties and retained such properties after aging for 300 hours at 200° C.

EXAMPLE III

Following the procedure employed in Example II, eight equivalent weights (2064 grams) of a partially condensed polysiloxane having a composition identical to that employed in Example II, eight equivalent wights (1016 grams) of bis(beta-hydroxyethyl) orthophthalate and 48 grams of glycerol (0.2 percent excess hydroxyl groups per equivalent weight of the diester) were heated in a 12-liter flask at a temperature of from about 160° C. to about 205° C. over a period of approximately three hours. A total of 334 grams of ethanol were evolved, which amount is 91 percent of the total amount calculated to be recovered if the reaction were allowed to go to completion. The modified polymer thus prepared was then dissolved in xylene.

To a solvent solution of the modified polymer was added approximately 9 percent by weight of a triazine type thermosetting resin (in solution) sold by the Rohm and Haas Corp. under the trade-name of "Uformite M–311." This formulation was of the following composition:

| | Percent by weight |
| --- | --- |
| Modified polysiloxane | 36 (solids) |
| Uformite M–311 | 4 (solids) |
| Xylene | 30 |
| Solvesso 100 | 15 |
| Solvesso 150 | 15 |

The composition prepared in Example III was applied, in a thickness of one mil, to an oxide coated copper wire, cured at 200° C. and specimens thereof subjected to various tests to determine the enamel life, scrape value, bend resistance and resistance to boiling water, solvents, sulfuric acid and sodium hydroxide of the modified polysiloxane coating. Enamel life of the coating was measured by aging a specimen at 200° C. in an air oven and periodically removing the specimen and bending it about a one-half inch mandrel until cracking of the enamel occurs. Scrape value determinations were made on a "Westinghouse scrape tester" and are measurements in ounces of the abrasion resistance of the coating. Numerically, the greater the value obtained the greater the resistance to abrasion. The bend resistance of the coating was measured in a manner similar to that employed in determining enamel life, however in this instance the coated wire was bent about a mandrel of a size of its own diameter.

To compare the properties of the modified polysiloxanes of this invention with those of known and previously employed compositions, determinations similar to those above were made on specimens prepared by coating an oxide coated No. 17 copper wire with a conventional organic wire enamel and an all silicone wire enamel. In the tables below there appears the data obtained.

Table I
PROPERTIES OF WIRE ENAMELS

| | Enamel Life at 200° C., hrs. | Scrape Value (Oz.) | Time of own diameter Bend Test Failure, hrs. |
| --- | --- | --- | --- |
| bis(oxyethyl) orthophthalate linked polysiloxane | >1,000 | 20–25 | 300 |
| Conventional all silicone wire enamel | >1,000 | >10 | 300 |
| Conventional organic wire enamel | <10 | 35 | <10 |

Table II
PROPERTIES OF WIRE ENAMELS—RESISTANCE TO WATER AND SOLVENTS

| | 1 Hr. Boiling Water | 10 Min. Boiling Toluene-alcohol Mixture | 24 Hrs. 5% NaOH Solution | 24 Hrs. 5% H₂SO₄ Solution |
|---|---|---|---|---|
| bis(oxyethyl) orthophthalate linked polysiloxane | No Attack | Very Slight Softening | Very Slight Attack | No Attack. |
| Conventional all silicone wire enamel | do | Softening | do | Some Attack. |
| Conventional organic wire enamel | do | do | do | No Attack. |

From the above tables it is readily seen that the modified polysiloxanes of this invention possess the desirable properties of both the all silicone and the conventional organic wire enamels but do not possess their undesirable properties. In addition it was found that when applying the above compositions to a No. 17 copper wire by means of a commercial wire coating tower that a temperature of above 800° F. was required to effect curing of the all silicone composition whereas temperatures of 690° F. and 720° F. were required to effect curing of the conventional organic composition and of the bis(oxyethyl)orthophthalate linked polysiloxane, respectively.

There was also prepared, a composition obtained by reacting a phthalic anhydride-glycerol ester with a polysiloxane of the same composition as those employed in Examples I, II and III, with the exception that it contained 17.1 percent by weight of ethoxy groups. The phthalic anhydride-glycerol ester was prepared by reacting one equivalent weight phthalic anhydride with two equivalent weights of glycerol. The copolymer composition was prepared by heating, in a flask connected to a condenser, one equivalent weight of the ester with one equivalent weight of the polysiloxane. Ethanol was evolved during the reaction and heating was discontinued when bodying became imminent. The copolymeric material was then dissolved in xylene and applied to an oxide coated, No. 17 copper wire in a thickness of one mil. A specimen was cured for one hour at 130° C. in an air oven after which time it was removed and found to have a Westinghouse scrape value of 10 ounces and in addition found to pass the own diameter bend test. When the specimen was cured for one-half hour at 200° C., a Westinghouse scrape value of 15 ounces was observed, however the specimen failed the own diameter bend test as the enamel cracked. This failure in the bend test at such a short period indicated that the phthalic anhydride-glycerol ester modified polysiloxane is extremely brittle and thus unsatisfactory.

EXAMPLE IV

To a 500 ml. liter three-neck flask equipped with stirrer, thermometer, condenser and take-off trap were charged one-half equivalent weight (97.5 grams) of bis(beta-hydroxyethyl) tetrachloro-orthophthalate and one-half equivalent weight (136.5 grams) of a partially condensed polysiloxane identical composition to that employed in Example I with the exception that it contained 16.5% by weight of ethoxy groups. There was also added 3.1 grams of glycerol to provide an excess of hydroxyl groups in the reaction mixture. The ingredients in the flask were heated for two hours at a temperature of from about 140° C. to about 210° C. during which time approximately 18.4 grams of ethanol were evolved and recovered. This yield of ethanol is approximately 78% of that calculated to be recovered in the event of complete reaction. The modified polysiloxane was then dissolved in xylene and formulated into a white paint which was applied to the surface of a steel plate and cured. The coating retained its initial white color after subjection for 72 hours to a temperature of 200° C.

EXAMPLE V

Following the procedure disclosed in Example IV, one-half equivalent weight (63.5 grams) of bis(beta-hydroxyethyl) orthophthalate, one-half equivalent weight (135 grams) of a partially condensed phenyl and methyl polysiloxane having a hydrocarbon group to silicon atom ratio of 1.4, an ethoxy group to silicon atom ratio of 0.62 and containing 17.1 percent by weight of ethoxy groups, and 3.4 grams of pentaerythritol were reacted for a period of 3 hours at a temperature from about 140° C. to about 235° C. During this period approximately 87% of the calculated amount of ethanol to be recovered in the event of complete reaction was collected. The polymeric material was then dissolved in xylene, applied to a No. 17 oxide treated copper wire and cured. When tested on the "Westinghouse scrape tester" a scrape value of 25 ounces was obtained. In a own diameter bend test conducted at 200° C., it was found that the coating underwent treatment for 300 hours before failure.

EXAMPLE VI

Following the general procedure disclosed in Example IV, one equivalent weight (127 grams) of bis(beta-hydroxyethyl) orthophthalate and one equivalent weight (436 grams of an 86 precent solids solution in toluene) of a partially condensed phenyl and methyl polysiloxane having a hydrocarbon group to silicon atom ratio of 1.4, a phenyl group to methyl group ratio of 2.5, an ethoxy group to silicon atom ratio of .38 and containing 12% by weight of ethoxy groups were reacted at a temperature of 215° C. During the reaction the toluene solvent was first to evolve and subsequently approximately 50% of the total calculated amount of ethanol to be recovered was obtained. The polymeric material was compounded into a white paint with titania, applied to a steel panel and cured. During heat aging tests at 200° C., the coating showed good stability.

EXAMPLE VII

A partially condensed phenyl polysiloxane containing ethoxy groups bonded to some of the silicon atoms thereof was prepared by treating phenyl trichlorosilane with a water-ethanol mixture in the presence of a solvent. The polymer had a phenyl group to silicon atom ratio of 1, an ethoxy group to silicon atom ratio of 0.38, a molecular weight of 2500 and contained 11.7% by weight of ethoxy groups.

To a one-liter, three-neck flask equipped with stirrer, thermometer, fractionating column and a reflux condenser were charged slightly over one-quarter equivalent weight (76 grams) of bis(beta-hydroxyethyl) orthophthalate, one-quarter equivalent weight (235 grams, 81.5 percent solids in toluene) of the above polysiloxane and 60 grams of dimethyl formamide (mutual solvent). The charge was heated for a period of approximately four hours at a temperature of about 175° C. During this period toluene and ethanol were evolved and collected. There was recovered approximately 52 percent of the total calculated amount of ethanol to be received in the event of a complete reaction. The modified polymer was then dissolved in toluene and compounded into a white paint with titania in a ratio of 60 parts titania per 100 parts polymer solids. This paint was applied to several steel panels and cured to a high gloss white coating in one-half hour at 200° C. When aged for 1000 hours at 200° C. the coating had retained its initial color and gloss characteristics. It was also found that the coating was resistant to attack from 5 percent solutions of sodium hydroxide and hydrochloric acid, and resistant to attack from boiling water, toluene and a mixture of cottonseed oil and oleic acid. Flexibility and adhesion properties of the coating were excellent.

EXAMPLE VIII

To a one-liter, three-neck flask equipped with a stirrer, thermometer, fractionating column and reflux condenser were charged one and two-tenths equivalent weight (152 grams) of bis(beta-hydroxyethyl) orthophthalate and one equivalent weight 158 grams) of a partially condensed phenylpolysiloxane having a phenyl group to silicon atom ration of 1, an ethoxy group to silicon atom ratio of 0.9, a molecular weight of 1000 and containing 28.5 percent by weight of ethoxy groups. The charge was heated for a period of approximately four hours at a temperature of about 175° C. During this period there was distilled 23 grams of ethanol which amount is approximately 50% of the total calculated amount of ethanol to be recovered in the event of a complete reaction. The modified polymer was then dissolved in xylene.

A No. 112 heat desized glass cloth of three mils thickness was impregnated with a solvent solution of the modified polysiloxane in two dips and cured to an overall thickness of seven mils. The impregnation procedure included a 15-minute precure at 150° C. after the first dip and a one hour final cure at 200° C. The specimens were transparent, colorless, flexible tapes which were subjected to the following heat aging and bending tests wherein the dielectric strength was employed as a measure of performance:

| Specimens | Dielectric Strength | |
|---|---|---|
| | After Cure, volts per mil. | After 850 hours at 200° C., volts per mil. |
| Unbent | 1,460 | 2,110 |
| Bent 180° over ⅛″ mandrel | 1,370 | 1,150 |

For the purposes of comparison a glass cloth similar to that above was coated with various organic resins and subjected to the above tests. In each instance it was found that the organic resin coated glass cloths badly deteriorated during aging at 200° C. in about forty-eight hours.

EXAMPLE IX

Following the procedure disclosed in Example VIII, one-half equivalent weight (63.5 grams) of bis(beta-hydroxyethyl) orthophthalate, one-half equivalent weight (61.6 grams) of a partially condensed phenylpolysiloxane having a phenyl group to silicon atom ratio of 1, an ethoxy group to silicon atom ratio of 1.5, a molecular weight 650 and containing 36.5 percent by weight of ethoxy groups were reacted for a period of 80 minutes at a temperature of from about 140° C. to about 200° C. During the reaction approximately 13 grams of ethanol were recovered which amount is approximately 61% of the calculated amount of ethanol to be recovered in the event of complete reaction. The polymer was then dissolved in toluene, applied to a nickel clad No. 17 copper wire and cured. When passed through the "Westinghouse scrape tester" a scrape value of 30 ounces was obtained. After aging for 200 hours at 200° C. the coating did not fail during the own diameter bend test.

EXAMPLE X

To a three-neck flask equipped with stirrer, thermometer, condenser and take-off trap were charged one-half equivalent weight (85.5 grams) of bis(beta-hydroxy-ethyloxyethyl) orthophthalate and one-half equivalent weight (235 grams, 81.5% solids in toluene) of a partially condensed phenyl polysiloxane having a phenyl group to silicon atom ratio of 1 and containing 11.7% by weight of ethoxy groups. The ingredients were heated for a period of 1¾ hours at a temperature of from about 140° C. to 180° C. during which time approximately 11.5 grams of ethanol were recovered. The amount of recovered ethanol is approximately 50% of the calculated amount of ethanol to be received in the event of complete reaction. The polymer obtained was then dissolved in toluene and applied to a steel plate and a portion of glass cloth. The cured coatings were tough and flexible.

EXAMPLE XI

To a three-neck flask equipped with stirrer, thermometer and take-off trap were charged one equivalent weight (171 grams) of bis(beta-hydroxyethyl-oxyethyl) orthophthalate and one equivalent weight (158 grams) of a partially condensed phenyl polysiloxane, having a phenyl group to silicon atom ratio of 1 and containing 28.5% by weight of ethoxy groups. The ingredients were heated for a period of 65 minutes at a temperature of about 185° C. During the reaction 27 grams of ethanol were recovered which amount is approximately 59% of the amount of ethanol to be recovered in the event of a complete reaction. The modified polymer was then dissolved in toluene. This polymer was applied to a glass cloth and cured. The coating did not crack or flake when flexing of the glass cloth occurred.

EXAMPLE XII

A partially condensed phenyl and methyl polysiloxane containing ethoxy groups bonded to some of the silicon atoms thereof was prepared by treating a mixture comprising 60 mol percent phenyltrichlorosilane, 20 mol percent diphenyldichlorosilane and 20 mol percent dimethyldichlorosilane with a water ethanol mixture in the presence of a solvent. The polymer had a hydrocarbon group to silicon atom ratio of 1.4, a phenyl group to methyl group ratio of 2.5 and contained 17.4% by weight of ethoxy groups.

To a three-liter, three-neck flask equipped with stirrer, thermometer, condenser, and take-off trap were charged one-half equivalent weight of the above polysiloxane and one-half equivalent weight of bis(beta-hydroxyethyl) terephthalate. The charge was heated at a temperature of 200° C. and ethanol was evolved during the reaction. Heating was discontinued when the viscosity increase of the mixture indicated that bodying was imminent. The product was dissolved in toluene, applied to a No. 17 copper wire and cured. A specimen of the coated wire was passed through a "Westinghouse scrape tester" and a scrape value of 25 ounces was obtained.

EXAMPLE XIII

Employing the apparatus disclosed in Example XII, 0.68 equivalent weight (192 grams) of a partially condensed polysiloxane having a composition identical to that employed in Example XII with the exception that it contained 16.5% by weight of ethoxy groups, 0.68 equivalent weight (168 grams) of bis(beta-hydroxyethyl) chlorendate (obtained by reacting ethylene glycol with chlorendic acid) and 4.5 grams of glycerol were reacted at a temperature of from 180° C. to 210° C. for approximately one hour. A total of 26 grams of ethanol were evolved which amount is approximately 80% of the total amount calculated to be recovered if the reaction were allowed to go to completion. The polymer thus prepared was then dissolved in toluene and compounded with titanium dioxide to form a white paint. A number of steel panels were then coated with this paint and the coatings cured in one-half hour at a temperature of 200° C. High gloss white coatings were obtained.

I claim:
1. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups, (b) silicon bonded hydrocarbonoxy groups, said hydrocarbonoxy groups being taken from the class consisting of alkoxy and aryloxy groups and being present in an amount by weight of from about 5% to about 40% of the total weight of said organopolysiloxanes, with a bis(hydroxyalkyl) dicarboxylate, said dicarboxylate consisting of only hydrogen, carbon and oxygen atoms and containing a total of from 8 to about 18 carbon atoms where each of the hydroxyalkyl portions of said bis(hydoxyalkyl) dicarboxylate contains from 2 to 4 carbon atoms, at a temperature of from about 140° C. to about 250° C. to obtain a modified polysiloxane containing residual hydrocarbonoxy groups.

2. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups, (b) from 0.2 to 2.0 silicon-bonded hydrocarbonoxy groups per silicon atom, said hydrocarbonoxy groups being taken from the class consisting of alkoxy and aryloxy groups, the percent by weight of said hydrocarbonoxy groups being from about 5 percent to about 40 percent of the total weight of said organopolysiloxane, with a bis(hydroxyethyl) dicarboxylate, said dicarboxylate consisting of only hydrogen, carbon and oxygen atoms and containing a total of from 8 to about 18 carbon atoms at a temperature of from about 140° C. to about 250° C. to obtain a modified polysiloxane containing residual hydrocarbonoxy groups.

3. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups, (b) from 0.3 to 1.5 silicon-bonded alkoxy groups per silicon atom, the percent by weight of said alkoxy groups being from about 5 percent to about 40 percent of the total weight of said organopolysiloxane, with a bis(hydroxyethyl) dicarboxylate, said dicarboxylate consisting of only hydrogen, carbon and oxygen atoms and containing a total of from 8 to about 18 carbon atoms at a temperature of from about 140° C. to about 250° C. to obtain a modified polysiloxane containing residual alkoxy groups.

4. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups, (b) from 0.3 to 1.5 silicon-bonded alkoxy groups per silicon atom, the percent by weight of said alkoxy groups being from about 5 percent to about 40 percent of the total weight of said organopolysiloxane, with bis(beta-hydroxyethyl) phthalate at a temperature of from about 140° C. to about 250° C. to obtain a modified polysiloxane containing residual alkoxy groups.

5. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups, (b) from 0.3 to 1.5 silicon-bonded ethoxy groups per silicon atom, the percent by weight of said ethoxy groups being from about 5 percent to about 40 percent of the total weight of said organopolysiloxane, with bis(beta-hydroxyethyl) phthalate at a temperature of from about 140° C. to about 250° C. to obtain a modified polysiloxane containing residual ethoxy groups.

6. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom said hydrocarbon groups being taken from the class consisting of phenyl and methyl groups and the amount of said silicon-bonded methyl groups present varying from 0% to about 40% of the amount of said silicon-bonded phenyl groups, (b) from 0.3 to 1.5 silicon-bonded ethoxy groups per silicon atom, the percent by weight of said ethoxy groups being from about 5 percent to about 40 percent of the total weight of said organopolysiloxane, with bis(beta-hydroxyethyl tetrachloro orthophthalate at a temperature of from about 140° C. to about 250° C. to obtain a modified polysiloxane containing residual ethoxy groups.

7. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups, (b) from 0.3 to 1.5 silicon-bonded ethoxy groups per silicon atom, the percent by weight of said ethoxy groups being from about 5 percent to about 40 percent of the total weight of said organopolysiloxane, with bis(beta-hydroxyethyl) 3-nitro orthophthalate at a temperature of from about 140° C. to about 250° C. to obtain a modified polysiloxane containing residual ethoxy groups.

8. A process for preparing modified polysiloxanes which comprises reacting an organopolysiloxane having a molecular weight of from 400 to 4000 and having (a) from 1.0 to 1.6 silicon-bonded monovalent hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups, (b) from 0.3 to 1.5 silicon-bonded ethoxy groups per silicon atom, the percent by weight of said ethoxy groups being from about 5 percent to about 40 percent of the total weight of said organopolysiloxane, with bis(beta-hydroxyethyl) hexachloroendomethylenetetrahydrophthalate at a temperature of from about 140° C. to about 250° C. to obtain a modified polysiloxane containing residual ethoxy groups.

9. A new composition of matter comprising a plurality of recurring polysiloxane portions, said polysiloxane portions having a molecular weight of from 400 to 4000, at least some of said polysiloxane portions containing residual hydrocarbonoxy groups selected from the class consisting of alkoxy and aryloxy groups and containing from 1.0 to 1.6 monovalent silicon-bonded hydrocarbon groups per silicon atom, said groups being selected from the class consisting of methyl and phenyl groups and the amount of said silicon-bonded methyl groups present varying from 0% to about 40% of the amount of said silicon-bonded phenyl groups present, said polysiloxane portions being connected by divalent bis(oxyalkyl) dicarboxylate radicals wherein the oxy oxygen thereof is connected directly to silicon by silicon oxygen bond, said bis(oxyalkyl) dicarboxylate radicals containing a total of from 8 to 18 carbon atoms and each of the oxyalkyl portions thereof is free of hydroxyl groups and contains from 2 to 4 carbon atoms.

10. A new composition of matter comprising a plurality of recurring polysiloxane portions, said polysiloxane portions having a molecular weight of from 400 to 4000, at least some of said polysiloxane portions containing residual alkoxy groups containing from 1.0 to 1.6 monovalent silicon-bonded hydrocarbon groups per silicon atom, said hydrocarbon groups being taken from the class consisting of phenyl and methyl groups and the amount of said silicon-bonded methyl groups present varying from 0% to about 40% of the amount of said silicon-bonded phenyl groups present, said polysiloxane portions being connected by divalent bis(oxyalkyl) dicarboxylate radicals wherein the oxy oxygen thereof is connected directly to silicon by silicon oxygen bond, said bis(oxyalkyl) dicarboxylate radicals containing a total of from 8 to 18 carbon atoms and each of the oxyalkyl portions thereof is free of hydroxyl groups and contains from 2 to 4 carbon atoms.

11. A new composition of matter comprising a plurality of recurring polysiloxane portions, said polysiloxane portions having a molecular weight of from 400 to 4000, at least some of said polysiloxane portions containing residual ethoxy groups and containing from 1.0 to 1.6 monovalent silicon-bonded hydrocarbon groups per silicon atom, said hydrocarbon groups consisting of phenyl and methyl groups and the amount of said silicon-bonded methyl groups present varying from 0% to about 40% of the amount of said silicon-bonded phenyl groups present, said polysiloxane portions being connected by divalent bis(oxyalkyl) dicarboxylate radicals wherein the oxy oxygen thereof is connected directly to silicon by silicon oxygen bond, said bis(oxyalkyl) dicarboxylate radicals containing a total of from 8 to 18 carbon atoms and each of the oxyalkyl portions thereof is free of hydroxyl groups and contains from 2 to 4 carbon atoms.

12. A new composition of matter comprising a plurality of recurring polysiloxane portions, said polysiloxane portions having a molecular weight of from 400 to 4000, at least some of said polysiloxane portions containing residual ethoxy groups and containing 1.0 to 1.6 monovalent silicon-bonded hydrocarbon groups per silicon atom, said hydrocarbon groups consisting of phenyl and methyl groups and the amount of said silicon-bonded methyl groups present varying from 0% to about 40% of the amount of said silicon-bonded phenyl groups present, said polysiloxane portions being connected by divalent bis(oxyethyl) dicarboxylate radicals wherein the oxy oxygen thereof is connected directly to silicon by silicon oxygen bond, said bis(oxyethyl) dicarboxylate radicals containing a total of from 8 to 18 carbon atoms and each of the oxyethyl portions thereof is free of hydroxyl groups.

13. A new composition of matter comprising a plurality of recurring polysiloxane portions, said polysiloxane portions having a molecular weight of from 400 to 4000, at least some of said polysiloxane portions containing residual ethoxy groups and containing 1.0 to 1.6 monovalent silicon-bonded hydrocarbon groups per silicon atom, said hydrocarbon group consisting of phenyl and methyl groups and the amount of said silicon-bonded methyl groups present varying from 0% to about 40% of the amount of said silicon-bonded phenyl groups present, said polysiloxane portions being connected by divalent bis(oxyethyl) phthalate radicals wherein the oxy oxygen thereof is connected directly to silicon by silicon oxygen bond, said oxyethyl portions of said bis(oxyethyl) phthalate radicals being free of hydroxyl groups.

14. A new composition of matter comprising a plurality of recurring polysiloxane portions, said polysiloxane portions having a molecular weight of from 400 to 4000, at least some of said polysiloxane portions containing residual ethoxy groups and containing 1.0 to 1.6 monovalent silicon-bonded hydrocarbon groups per silicon atom, said hydrocarbon groups consisting of phenyl and methyl groups and the amount of said silicon-bonded methyl groups present varying from 0% to about 40% of the amount of said silicon-bonded phenyl groups present, said polysiloxane portions being connected by divalent bis(oxyethyloxyethyl) phthalate radicals, said oxyethyloxyethyl portions of said divalent bis(oxyethyloxyethyl) phthalate radicals being free of hydroxyl groups.

References Cited in the file of this patent

UNITED STATES PATENTS

| | | |
|---|---|---|
| 2,584,344 | Goodwin et al. | Feb. 5, 1952 |
| 2,584,351 | Hunter et al. | Feb. 5, 1952 |
| 2,628,215 | Hunter et al. | Feb. 10, 1953 |